United States Patent [19]

Liscomb et al.

[11] Patent Number: 4,958,999
[45] Date of Patent: Sep. 25, 1990

[54] APPARATUS FOR PRODUCING POLYMERIZED PLUGS

[75] Inventors: Cristina Liscomb, Milford, Pa.; Anthony J. Buzzelli, Wallkill, N.Y.

[73] Assignee: Dow Corning Corporation, Midland, Mich.

[21] Appl. No.: 286,471

[22] Filed: Dec. 19, 1988

[51] Int. Cl.⁵ .................... B29C 35/04; B29C 39/30
[52] U.S. Cl. .................. 425/110; 264/148; 264/171; 264/236; 422/138; 425/308; 425/314; 425/404; 425/446; 526/88
[58] Field of Search ............... 264/40.7, 142, 145, 264/171, 338, 236, 347, 148; 425/110, 142, 308, 314, 404, 446; 53/522; 422/131, 138; 526/64, 88, 227, 328.5, 329.7

[56] References Cited

U.S. PATENT DOCUMENTS

| | | | |
|---|---|---|---|
| 3,040,013 | 6/1962 | Kuhn | 526/88 |
| 3,061,401 | 10/1962 | Studer et al. | 264/70 |
| 3,383,448 | 5/1968 | Bader et al. | 264/171 X |
| 3,558,759 | 1/1971 | Sarem | 264/142 |
| 3,560,460 | 2/1971 | Gilbert | 526/64 |
| 3,900,453 | 8/1975 | Shimada et al. | 526/227 X |
| 3,950,467 | 4/1976 | Yazawa et al. | 264/561 |
| 3,956,442 | 5/1976 | Boulain | 264/562 |
| 3,966,847 | 6/1976 | Seiderman | 526/227 X |
| 3,969,054 | 7/1976 | Roane | 425/142 |
| 3,993,834 | 11/1976 | Chimura et al. | 264/171 X |
| 4,413,965 | 11/1983 | Kinoshita et al. | 425/71 |
| 4,547,329 | 10/1985 | Dorabroski et al. | 264/145 X |
| 4,569,811 | 2/1986 | Geier | 264/143 |
| 4,711,938 | 12/1987 | Suka et al. | 526/88 |

*Primary Examiner*—Jeffery Thurlow
*Assistant Examiner*—Leo B. Tentoni
*Attorney, Agent, or Firm*—Eckert Seamans Cherin & Mellot

[57] ABSTRACT

A process and apparatus are provided for producing polymerized plugs in which the polymerization starting materials are passed through heated reaction tubes by gravity feed. The polymerized rods so produced are cut into plugs and packaged for use. In an alternative embodiment, the polymerization starting materials are first encased within flexible sleeves, and the flexible sleeves are then passed through the heated tubes by gravity feed to form polymerized rods. Apparatus for performing the process includes at least one tube having an inlet opening and an outlet opening, the outlet opening being at a lower elevation than the inlet opening to provide for gravity feed through the tube, and structure to heat the tube. A cutting device cuts the polymerized rods into plugs as they exit the outlet opening.

2 Claims, 6 Drawing Sheets

APPARATUS FOR PRODUCING POLYMERIZED PLUGS

BACKGROUND OF THE INVENTION

1. Field of the Invention

This invention relates generally to polymerization processes and apparatus, and more particularly to processes and apparatus for the production of polymerized plugs.

2. Description of the Prior Art

Polymerized plugs are useful for the gradual release into the surrounding environment of active ingredients embedded within the plugs. The active ingredients may be biological lures such as pheromones, which are used to attract insects so that they may be counted for biological surveys or killed by suitable means. Other actives can be incorporated into plugs for other uses, for example, to deodorize. The polymerized plugs are sometimes encased within a flexible sleeve during the production process, which sleeve in the finished product acts to control the rate of release of the actives to the surrounding environment.

The production of polymerized plugs has previously been a time consuming and expensive process. The polymerization reactants and the desired active ingredients are sealed within an elongated flexible sleeve. A chemical polymerization initiator is usually included. The sleeve is then heated, in one method, by immersing the sleeve in a heated liquid to effectuate polymerization. The polymerized rods so formed in the sleeve are then cut transversely to form several plugs. The plugs are then sorted and packaged.

It would be desirable to provide a process and apparatus which could rapidly produce polymerized plugs on a continuous or semi-continuous basis. It would also be desirable to provide a process and apparatus which would permit the production of plugs from many different polymerization reactants and containing many different active ingredients. It would additionally be desirable to provide a process and apparatus which could produce the plugs in varying dimensions.

SUMMARY OF THE INVENTION

It is an object of the invention to provide a process and apparatus which will rapidly produce polymerized plugs on a continuous or semi-continuous basis.

It is another object of the invention to provide a process and apparatus which will permit the production of the polymerized plugs from many different reactants.

It is yet another object of the invention to provide a process and apparatus for the production of polymerized plugs by which a number of active ingredients can be incorporated into the plugs.

It is still another object of the invention to provide a process and apparatus which can produce polymerized plugs of varying dimensions.

These and other objects are accomplished by a process and apparatus for the production of polymerized plugs in which polymerization starting materials travel through heated tubes to produce polymerized rods. The starting materials enter the tubes through an inlet opening and pass at least in part by gravity feed through an outlet opening that is lower in elevation than the inlet opening. Structure at the outlet opening is provided to cut the rods at predetermined lengths into plugs. The plugs can then be processed further, if necessary, and packaged.

The tubes are preferably manufactured from a material to which the polymerizing rods will not stick. Suitable materials include polypropylene and polytetrafluoroethylene. These materials will eventually lose their non-stick properties in a heated environment and must be replaced periodically. It is possible to coat the interior surfaces of the tubes with lubricants, by which materials which do not possess non-stick properties can be used to form the tubes. Glass is one such alternative material, and can be lubricated with suitable lubricants such as hexamethyldisilazane, trimethylmonochlorosilane, and other silicones. The tubes will normally be coated with the lubricants in a batch process, where a new coat of the lubricant is applied when necessary.

The speed at which the rods flow through the tubes can be adjusted by using lubricants with different viscosity and adhesion properties. It is desirable, for example, to increase the flow rate of the rods through the tubes when the polymerization reaction proceeds rapidly. The speed can also be adjusted by employing known pressure or vacuum feed techniques in addition to the gravity feed.

A plurality of tubes are preferably provided in a single reactor apparatus. The tubes can share a common inlet manifold communicating between the inlet openings of the tubes and a mixing chamber for the reactants.

The tubes can be provided as detachable tubular inserts, which can have different inside diameters. The outside diameter of the plugs polymerized in the tubes can thereby be controlled by changing the tubes.

The tubes can be heated by any of several suitable heating means. One such system would be to apply a hot fluid such as steam to the outside surface of the tubes. The tubes in this embodiment can be disposed within a reactor housing which receives steam from a steam inlet and releases the steam and any condensation through one or more outlets. A suitable insulation such as brick or glass foam can also be provided to minimize heat loss through the reactor housing.

An alternative process and apparatus according to the invention is useful for producing plugs from a tubular, flexible sleeve filled with the polymerization starting materials and sealed at the ends. This embodiment is especially preferable for plugs having a small diameter, for example, less than 0.5 centimeter. The flexible sleeve can be positioned onto a mechanical apparatus which feeds the sleeve through the tubes. Heat from the tube polymerizes the reactants within the flexible sleeve into a rod. The polymerized rod is cut into plugs as it leaves the tube. The plugs so formed have a circumferential jacket formed from the flexible sleeve. The circumferential jacket is especially desirable to prevent the rapid release of actives through the sides of the plugs.

The starting materials can include a number of different polymerization reactants. The polymerization reactants are preferably capable of crosslinking to form polymerized rods. A suitable crosslinking reactant is ethylene glycol dimethacrylate. The crosslinking reactant is normally combined with at least one non-crosslinking reactant such as 2-phenoxyethyl methacrylate (PEMA) or hexaethyl methacrylate (HEMA).

Many different active ingredients can be incorporated into the polymer matrix of the plugs, depending on the intended use of the plug. Pheromones, for example, can be incorporated into the plugs to attract insects. Suitable pheromones include 11-dimethyethyl-4-5- chloro-2-methylcyclohexanecarbooxylate; 2,4 dimethylzalero nitrole; Z7/2E-11 hexadecadaien-1-ol, acetate; and E/Z9-dodecenal acetate. Other active ingredients, such as fragrances and deodorizers, can alternatively be incorporated. A chemical initiator to assist polymerization may also be included in the polymerization starting materials. Suitable initiators include t-butyl peroctate.

BRIEF DESCRIPTION OF THE DRAWINGS

There are shown in the drawings embodiments which are presently preferred it being understood, however, that the invention is not limited to the precise arrangements and instrumentalities shown, wherein.

DETAILED DESCRIPTION OF THE PREFERRED EMBODIMENTS

Figure 1:
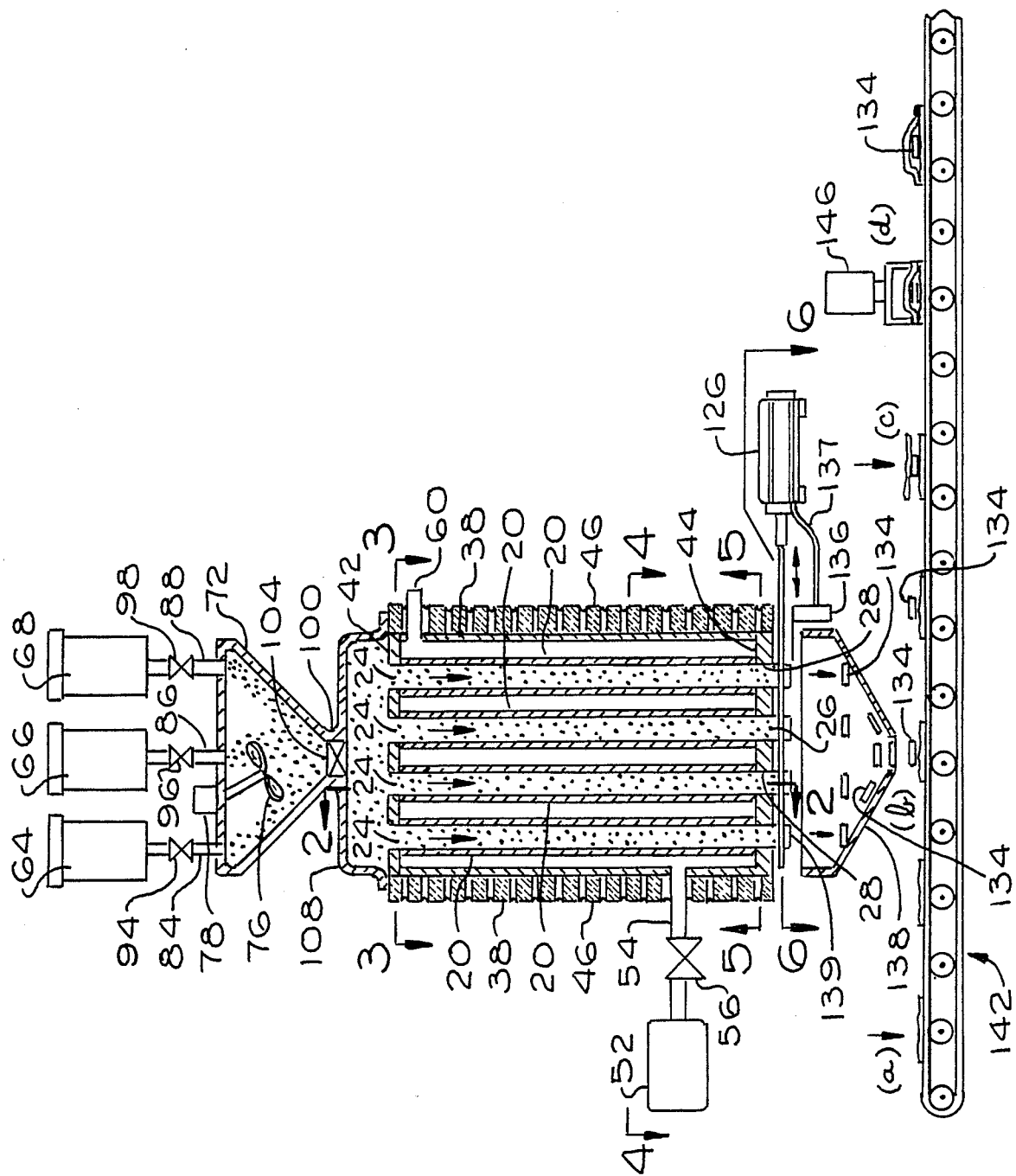
FIG. 1 is a schematic sectional diagram of a process and apparatus according to the invention.
Figure 2:
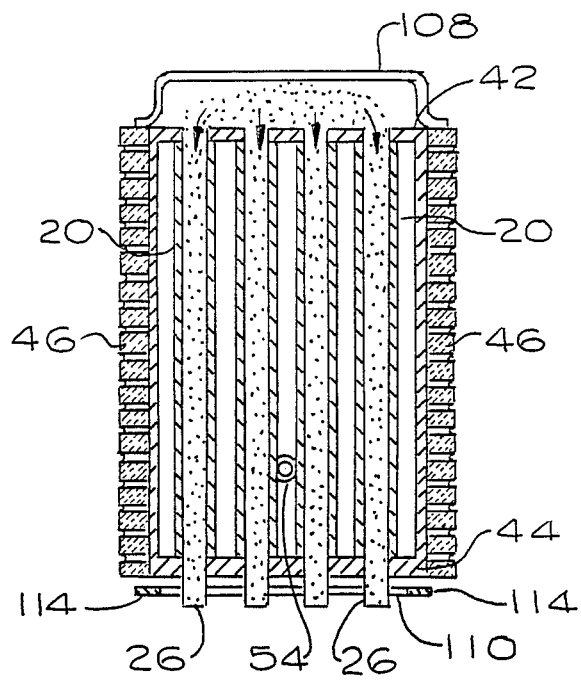
FIG. 2 is a cross-section taken along line 2—2 in FIG. 1.
Figure 3:
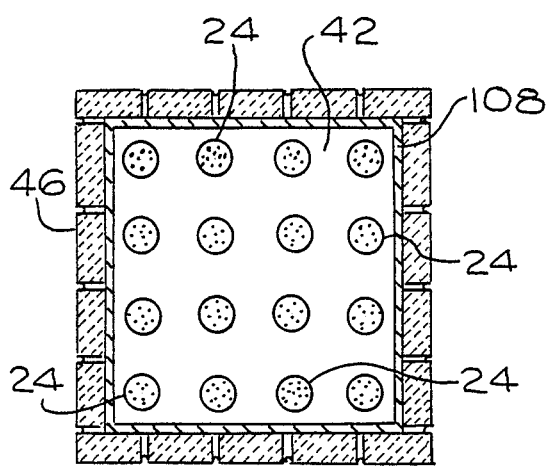
FIG. 3 is a cross-section taken along line 3—3 in FIG. 1.
Figure 4:
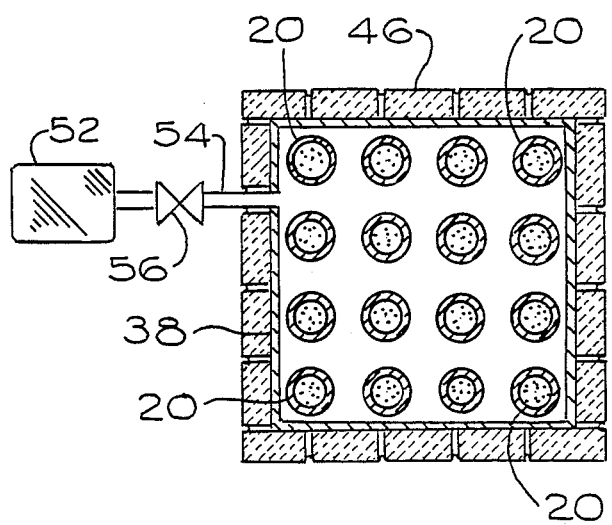
FIG. 4 is a cross-section taken along line 4—4 in FIG. 1.
Figure 5:
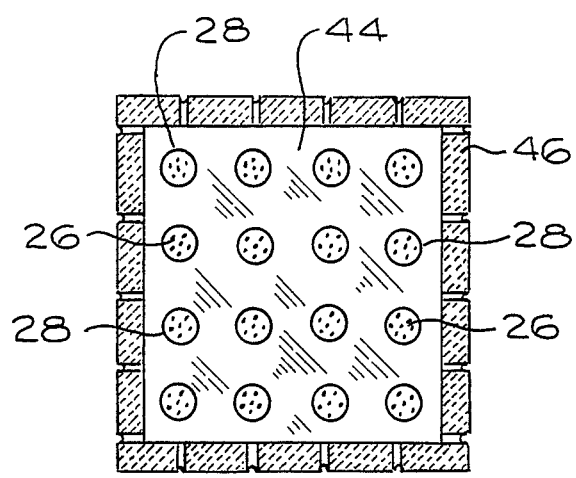
FIG. 5 is a cross-section taken along line 5—5 in FIG. 1.

Referring to FIGS. 1-6, there is shown a process and apparatus for making polymerized plugs. The invention comprises at least one, and preferably a plurality of heated tubes 20. The heated tubes 20 have inlet openings 24 and outlet openings 28. The inlet openings 24 are higher in elevation than the outlet openings 28, such that polymerization starting materials will pass through the heated tubes at least in part by gravity feed. The polymerization starting materials are heated during their residence within the tubes 20, and polymerize to form rods 26 which exit the tubes 20 through the outlet openings 28.

The tubes 20 can be heated by several means known in the art. A presently preferred method passes steam across an outside surface of the tubes 20. The tubes 20 can be mounted within an enclosure 38 which contains the steam and restricts heat loss. The tubes 20 can be fixed to and extend between a top plate 42 and a bottom plate 44. The enclosure 38 can itself be formed from insulating materials where possible, or can be surrounded by a layer of insulation such as the brick insulation 46 or other suitable insulation materials, including glass foam.

The present embodiment utilizes sixteen tubes in a symmetrical array. It will be understood, however, that the number and positioning of the tubes within the apparatus can be modified to adapt to the particular requirements of the job at hand.

Steam from a steam source 52 enters the enclosure 38 from an inlet line 54. Valve means 56 can be provided in the steam inlet line 54 to regulate the flow of steam into the enclosure 38. Steam exits the enclosure 38, through a steam outlet 60. The temperature inside the enclosure 38, for many polymerization reactions, is maintained at between about 70–90 degrees C., and most preferably is about 80 degrees C. A trap for steam condensation can be provided at the bottom of the enclosure 38.

The starting materials for the polymerization are stored in one or more material sources. Polymerization reactants, for example, usually in the form of a monomer solution, can be stored in a monomer receptacle 64. One or more chemical initiators may be desirable for the particular polymerization reaction, and can be stored in a initiator receptacle 66. One or more active ingredients will usually be incorporated into the polymerized plugs, and can be supplied to the reactant solution from an active ingredient receptacle 68. The polymerization reactants should be kept substantially at or below ambient temperature, preferably around 20 degrees C., to avoid premature reaction.

The various starting materials can be mixed in a suitable mixing chamber 72, and can be thoroughly intermixed by suitable mixing means such as the impeller 76 which is powered by suitable motor means 78. The starting materials from the storage receptacles 64, 66, and 68 enter the mixing chamber 72 through suitable inlet paths 84, 86, and 88, respectively. Flow through the paths 84, 86, and 88 can be controlled by suitable valves 94, 96, and 98, respectively. The reactants are preferably purged of unwanted contaminants prior to reaction. A purging stream of an inert gas such as nitrogen can be passed through the mixing chamber 72 through suitable inlet and outlet paths.

The mixed starting materials leave the mixing chamber 72 through a suitable outlet port 100 and the flow can be controlled by a valve 104. The starting materials preferably flow into an inlet manifold 108 which can be of suitable design to distribute the materials to the inlet openings 24.

Figure 6:
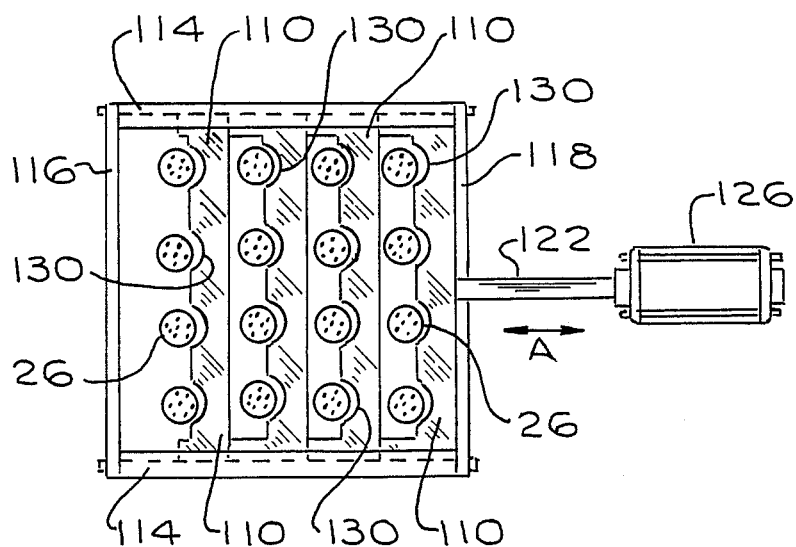
FIG. 6 is a cross-section taken along line 6—6 in FIG. 1.
Figure 7:
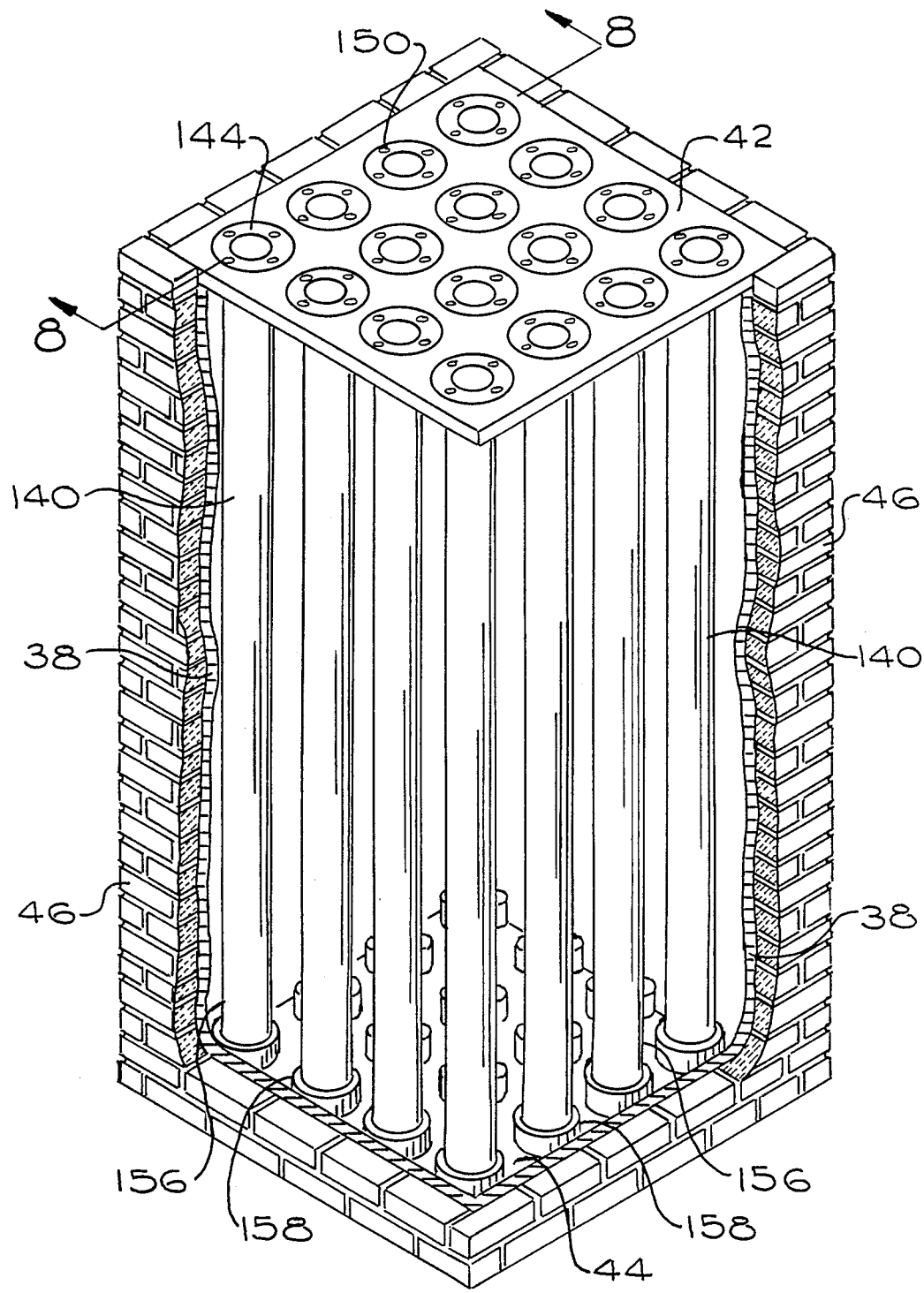
FIG. 7 is a perspective view, partially broken away, of an alternative embodiment.

The polymerized rods 26 leaving the outlet openings 28 are cut by suitable cutting means into plugs of a desired length. One suitable cutting device includes a plurality of cutting blades 110 spaced apart and disposed between supporting arms 114 (FIG. 6). A front cross bar 116 and a rear cross bar 118 span the support bars 114 and secure the assembly together The rear cross bar 118 is connected to a shaft 122 which is driven by a suitable motor 126 in the reciprocating action indicated by the arrow A. The blades 110 are spaced apart on the supporting arms 114 so as to permit the rods 26 to pass between them as they exit the tubes 20. The blades 110 have scalloped edge portions 130 which are adapted to cut the rods 26 as they exit the tubes 20. An edge 130 is positioned adjacent each rod 26. The motor 126 drives the blades 110 into the rods 26 to form plugs 134 of predetermined lengths.

The motor 126 can be actuated to cut the rods 26 at predetermined lengths by any suitable means. One such means would include a mechanical or electronic sensor 136 which is adapted to send a signal through a signal line 137 to the motor 126 when the ends 139 of the rods 26 extending past the cutting blades 110 have attained a predetermined length. The signal actuates the motor 126 to effectuate cutting at the proper length.

The plugs 134 fall from the blades 110 and can be collected in a suitable collecting hopper 138. The hopper 138 can also be provided with suitable means to sort the plugs by length, weight or other characteristics, if necessary. The plugs 134 leaving the hopper 138 can be passed to further treatment steps, or packaged directly. A suitable packaging line 142 can have a number of stations, such as the station (a) where packaging material is placed onto the conveyor; station (b), where the plugs 134 are placed onto the packaging; station (c), where a second layer of packaging is applied; and station (d), where the packaging is heat sealed by a suitable sealing device 146.

The invention can produce polymerized plugs from a variety of different starting materials. A number of different polymerization reactants, for example, can be utilized. The selection of the particular reactant will commonly depend on the intended use of the plugs. A preferred polymerization reactant is capable of crosslinking, such as ethylene glycol dimethacrylate (EGDM). The crosslinking reactant is usually combined with at least one non-crosslinking reactant such as 2-phenoxyethyl methacrylate (PEMA), or hexaethyl methacrylate (HEMA). Suitable chemical initiators usually are added to the reactants to assist polymerization. A preferred initiator is t-butyl perocatate.

The active ingredients incorporated into the polymerized plugs are selected for the intended use of the plugs. Pheromones are preferred active ingredients when the plugs are to be used as insect lures. A preferred pheromone is 11-dimethyethyl-4-5-chloro-2-methylcyclohexanecarbooxylate. Other suitable pheromones are Z7/2E-11 hexadecadaien-1-ol, acetate; E/Z9-dodecenal acetate; and 2,4 dimethylzalero nitrole. It is also possible to include other active compounds into the plugs for other specific uses, such as laurel methacrylate for deodorizers.

One suitable formulation would provide about 4:1 PEMA to EGDM, by weight. Approximately 1-3%, by weight, of the monomer solution would be made up of a suitable initiator for the polymerization reaction, such as t-butyl perocatate. This combined monomer solution would be mixed with a pheromone such as 11-dimethyethyl-4-5-chloro-2-methylcyclohexanecarbooxylate to arrive at a mixture having about 30% monomer solution and about 70% pheromone, by weight.

Figure 8:
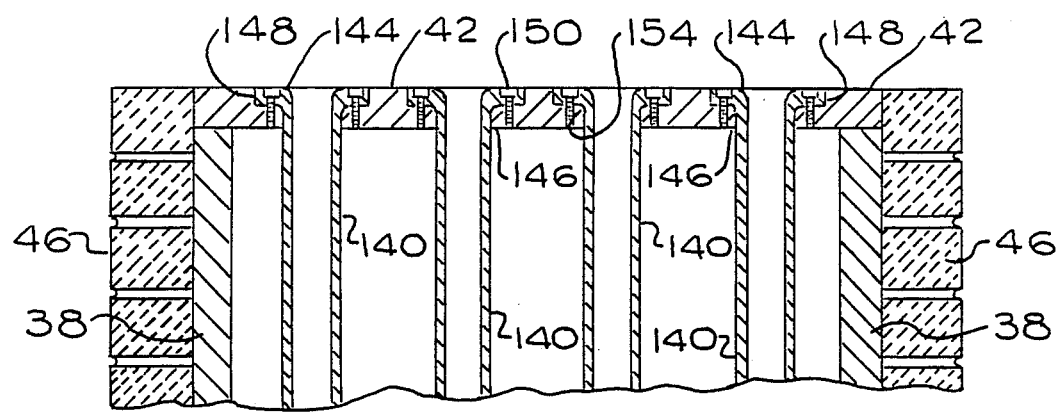
FIG. 8 is a cross-section taken along line 8—8 in FIG. 7.

In the alternative embodiment shown in FIGS. 7-10, the reactor apparatus of the invention can be utilized to produce plugs having different diameters. The apparatus, as before, includes an enclosure 38, a top plate 42, a bottom plate 44, and a layer of brick insulation 46. In this embodiment, however, the heated tubes are provided as interchangeable tubes 140. The interchangeable tubes 140 are adapted for removal from the enclosure 38 and can have a flange 144 which is adapted to fit a suitable recess 148 formed in the top plate 42 (FIG. 8). The interchangeable tubes 140 extend through openings 146 in the top plate 42. The flange 144 can have apertures 152 which are adapted to receive fastening means such as bolts 150, which pass through the apertures 152 and engage suitable threaded openings 154 in the top plate 42 to firmly secure the interchangeable tubes 140.

The bottom ends 156 of the interchangeable tubes 140 can be slip-fit into coupling boots 158 which extend upwardly from the bottom plate 44 and which encircle the outlet openings 28. The interchangeable tubes 140 can be removed from the enclosure 38 by removing the bolts 150 and sliding the ends 156 from the coupling boots 158. The inlet manifold 108 can be detachably fixed to the enclosure 38 by detachable fastening means such as bolts to facilitate the removal and replacement of the interchangeable tubes 140.

Figures 9, 10:
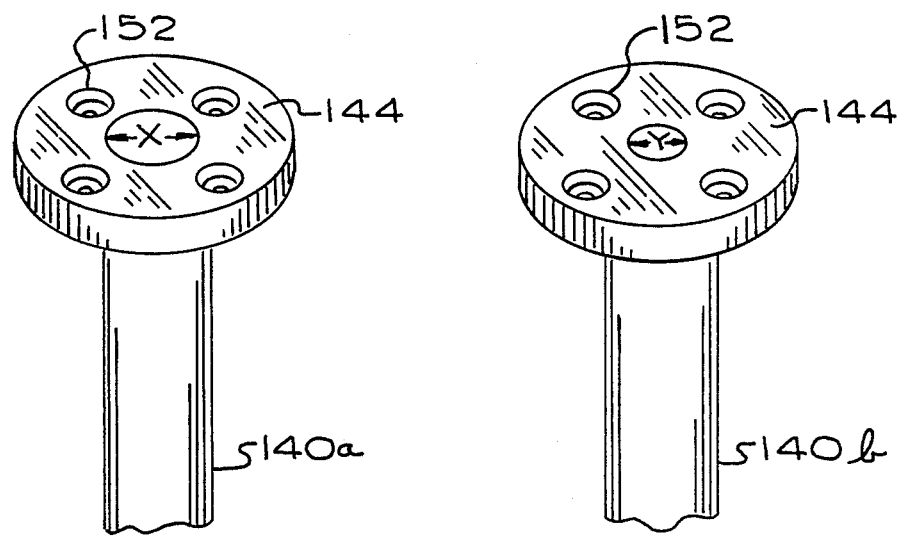
FIG. 9 is a perspective view of a large inside diameter tubular insert.
FIG. 10 is a perspective view of a small inside diameter tubular insert.

The interchangeable tube 140a shown in FIG. 9 has a large inside diameter X to produce plugs of a similar diameter. The interchangeable tube 140a can be removed and replaced by the interchangeable tube 140b (FIG. 10), which can have the same outside diameter as the interchangeable tube 140a, but has a smaller inside diameter Y to produce polymerized plugs of a smaller diameter. The interchangeable tubes can thereby be used in combination with the length sensor 136 to produce polymerized plugs of various diameters and lengths.

Figure 11:
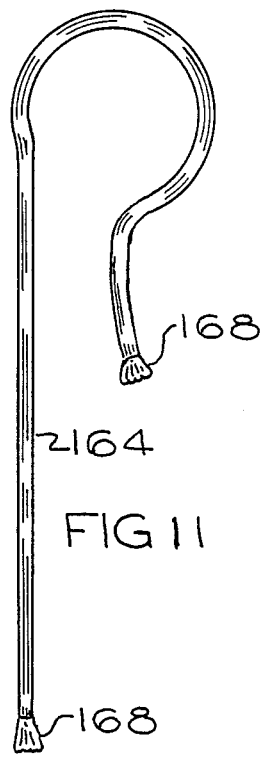
FIG. 11 is a plan view of a tubular sleeve.
Figure 12:
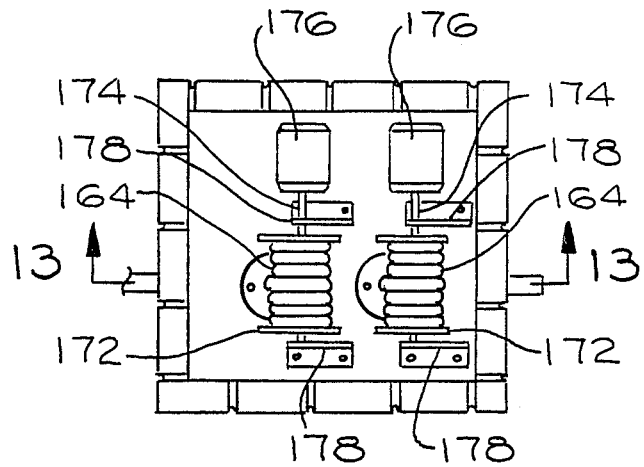
FIG. 12 is a plan view of a third embodiment of the invention.
Figure 13:
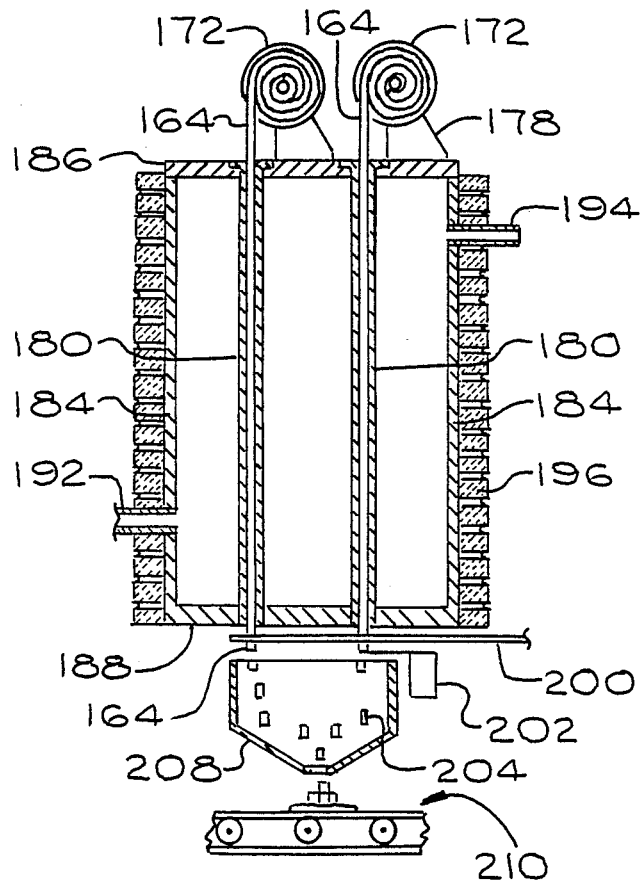
FIG. 13 is a cross-section taken along line 13—13 in FIG. 12.

Small diameter plugs, of less than approximately 0.5 centimeters, are commonly produced by encapsulating the polymerization starting materials in a tubular flexible sleeve 164 that is sealed at its ends by a seam 168 (FIG. 11). The flexible sleeves 164 can be wound onto spools 172 (FIGS. 12-13). The spools 172 can be connected to shafts 174 and suitable motor means 176. The shaft 174 is journaled through supporting brackets 178. The motors 176 can be used to unwind the flexible tubes 164 from the spools 172, and the flexible tubes 164 will pass by gravity feed through heated tubes 180 within an enclosure 184. The enclosure 184 has a top wall 186 and a bottom wall 188. The enclosure can have a steam inlet 192, a steam outlet 194 and brick insulation 196, as previously described. A cutting apparatus 200, as described above, can be activated by a length sensor 202 to cut the sleeve 164 into plugs 204 at a predetermined length. The plugs 204 can be collected in a hopper 208 and packaged in an assembly line 210.

This invention can be embodied in other specific forms without departing from the spirit or essential attributes thereof, and accordingly, reference should be made to the following claims, rather than to the foregoing specification, as indicating the scope of the invention.

I claim:

1. An apparatus for polymerizing rods from polymerization starting materials, comprising;
    a plurality of reaction tubes, each tube having an inlet opening and an outlet opening, the inlet opening being at a higher elevation than the outlet opening, whereby said starting materials will travel through said tube at least in part by gravity feed, said plurality of tubes having different inside diameters, said tubes being removably mounted within said enclosure, whereby said tubes having different inside diameters can be interchanged to produce rods of differing diameters; and,
    means for heating the reaction tubes, said heating means comprising means for contacting said tubes with a hot fluid, said means for contacting said tubes with a hot fluid comprising an enclosure, said enclosure having a fluid inlet communicating with a source of fluid and a fluid outlet for exiting said fluid, said tubes being mounted at least in part within said enclosure, whereby hot fluid passing through said enclosure from said fluid inlet to said fluid outlet will contact and heat said tubes, and whereby heat from said tubes will polymerize said starting materials into a rod, said rod exiting the reaction tube through said outlet opening.

2. An apparatus for producing polymerized plugs having a circumferential sleeve, comprising:

at least one flexible sleeve having polymerization starting materials encased within said sleeve;

a plurality of reaction tubes, the reaction tubes having an inlet opening and an outlet opening, the inlet opening being at a higher elevation than the outlet opening, whereby said flexible sleeve can be passed through said inlet opening and will travel through said tube to said outlet opening at least in part by gravity feed;

means for heating the reaction tubes, comprising means for contacting said tubes with a hot fluid, whereby said starting materials within said sleeve will polymerize as they travel through said reaction tubes, said means for contacting said tubes with a hot fluid comprising an enclosure having a fluid inlet communicating with a source of said hot fluid, and a fluid outlet, the tubes being disposed at least in part within said enclosure, whereby the tubes will be contacted by hot fluid travelling from said fluid inlet to said fluid outlet, said tubes being detachably mounted within said enclosure, whereby tubes of differing inside diameter can be mounted within the enclosure to produce plugs having differing diameters; and cutting means for cutting said sleeve into plugs of predetermined length as the sleeve exits the outlet opening.

* * * * *